April 16, 1940.   J. BRUNETTI   2,197,465
METHOD AND APPARATUS FOR MAKING WIRE CORE TEMPLES
Filed Jan. 3, 1938   2 Sheets-Sheet 1
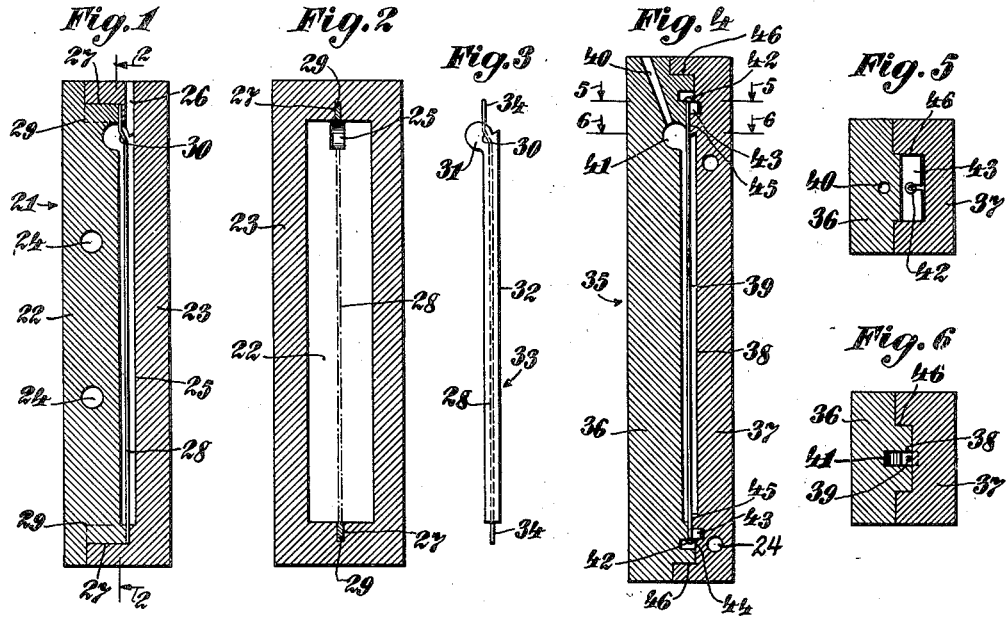
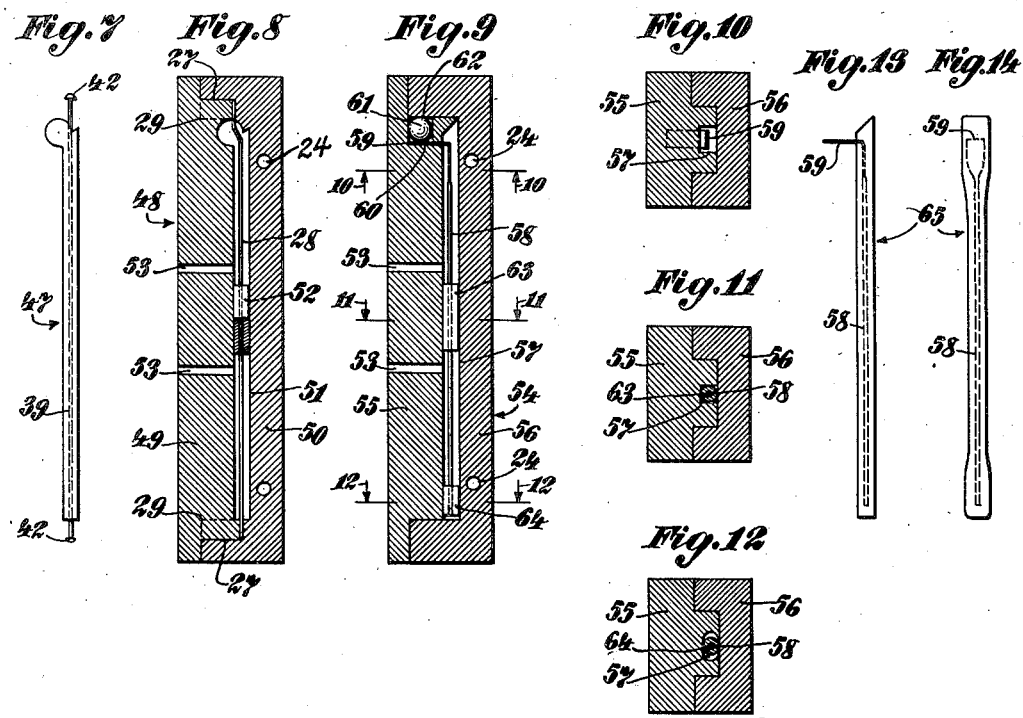
INVENTOR.
Joseph Brunetti
BY Louis Schumacher
ATTORNEY.

April 16, 1940.  J. BRUNETTI  2,197,465
METHOD AND APPARATUS FOR MAKING WIRE CORE TEMPLES
Filed Jan. 3, 1938  2 Sheets-Sheet 2

INVENTOR.
Joseph Brunetti
BY
ATTORNEY.

Patented Apr. 16, 1940

2,197,465

UNITED STATES PATENT OFFICE 2,197,465

METHOD AND APPARATUS FOR MAKING WIRE CORE TEMPLES

Joseph Brunetti, Carlstadt, N. J., assignor to Columbia Protektosite Co., Inc., Carlstadt, N. J., a corporation of New Jersey Application January 3, 1938, Serial No. 183,069

4 Claims. (Cl. 18—34)

This invention relates to devices having bendable wire cores and a sheath or casing of plastic molded material, wherein said devices may be retained in any bent position by the wire core. For example, the invention has particular reference to wire core spectacle temples. In its various phases, the invention includes the construction of such devices, the methods and apparatus for molding the same.

Heretofore wire core temples have been constructed by placing the wire cores in spaced parallel relation between two sheets of a plastic cellulose material. Under the application of a solvent, and heat and pressure, the sheets were fused together to completely encase the wire cores. Then the resultant article was severed into strips centrally between the wire cores. Thereafter these strips were cut down to the requisite round and tapered forms. In this operation, the wire core was sometimes exposed at a side of the temple, as in cases where the wire core happened to be noncentral to the strip. Finally, the hinge pieces were attached as by riveting. All this rendered the temple rather expensive. See patent application, Serial No. 171,667, filed October 29, 1937, describing ways and means for overcoming the difficulties mentioned.

It was considered impossible to mold a wire core temple by the high pressure injection process for molten plastic, which is cooled as injected so as to almost instantly solidify. It was thought that the plastic, entering at a pressure of many thousands of pounds per square inch would bend or deform the wire so that it would not lie in a straight line along the temple. Also the wire core would unduly restrict the already small flow area of the die cavity causing solidification before the cavity had been completely filled, and this defect would be accentuated by the cooling effect of the wire core. Since the cooled high pressure injection process is the accepted method today for the quantity production of small articles, the molding of a wire core temple would have to be accomplished in accordance with this process. Further, the positioning and holding of the wire core was considered a problem. For these various reasons it was not thought feasible to attempt to mold devices such as wire core temples. Even so, it does not appear that the possibility of molding wire core temples had heretofore been considered.

The present invention aims to provide simplified improved methods and apparatus for the inexpensive molding of devices such as wire core temples, with the latter being an improved construction, where desired.

Another object of the invention is to provide improved methods and means for holding a wire core in a cooled injection die.

Another object of the invention is to provide improved methods and means for avoiding the distortion of the wire core by the injection impact.

Another object of the invention is to provide improved methods and means for the molding of devices such as wire core temples without causing premature solidification of the plastic or unduly restricting the flow thereof in the die cavity.

A further object of the invention is to provide wire core temples of improved arrangement and construction, including particularly a reenforced molded hinge piece for the temple.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a central sectional view of a die with a wire core positioned therein and held at its ends, according to the invention.

Fig. 2 is a sectional view taken on line 2—2 thereof.

Fig. 3 is a view of the article produced thereby, embodying the invention.

Fig. 4 is a similar sectional view of a modified wire core tensioning apparatus embodying the invention.

Figs. 5 and 6 are sectional views taken on the lines 5—5 and 6—6 of Fig. 4.

Fig. 7 is a view of an article produced thereby, according to the invention.

Fig. 8 is a sectional view of a modified apparatus and method embodying the invention, and showing a spacing tube for the wire core, partly in section.

Fig. 9 is a sectional view of another modified form of apparatus according to the invention, with the wire core laterally held therein.

Figs. 10, 11 and 12 are sectional views taken on lines 10—10, 11—11, and 12—12 respectively, of Fig. 9.

Fig. 13 is a side view of an article produced thereby, embodying the invention.

Fig. 14 is another view of the article.

Figure 15:
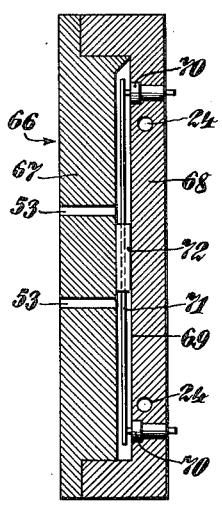

Fig. 15 is a sectional view of an apparatus according to another modification of the invention, and showing the wire core temple in an electrical circuit therein.

Figure 16:
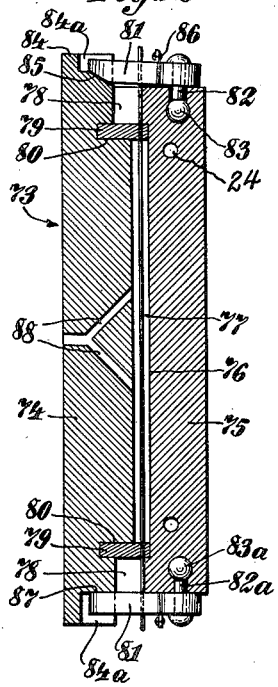

Fig. 16 is a sectional view of another modification of the invention, showing a wire core tensioningly held therein.

Figure 17:
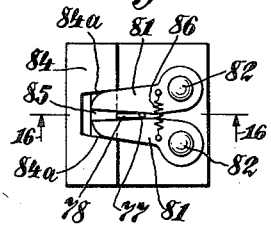

Fig. 17 is a top plan view of the same.

Figure 18:
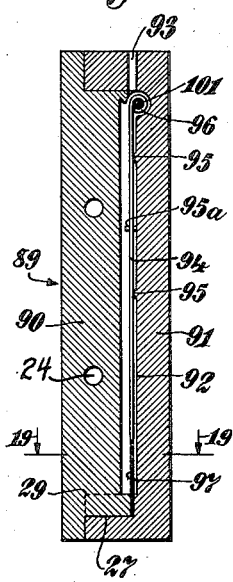

Fig. 18 is a sectional view of still another modified form of apparatus, with a wire core therein nearer to one side of the die cavity, and axial injection means.

Figure 19:
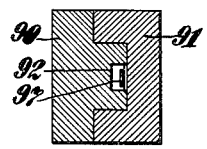

Fig. 19 is a sectional view thereof taken on line 19—19 of Fig. 18.

Figure 20:
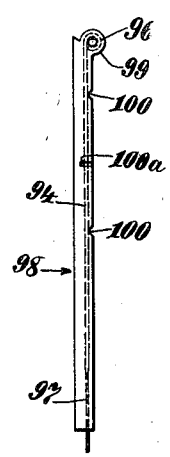

Fig. 20 is a view of a wire core temple produced thereby, embodying the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 21 denotes an apparatus or injection embodying the invention, and illustrating the methods used and the articles produced according to the invention. Generally, the die consists of two or more parts, one or more of which may be provided with a mold cavity, one or more of which having an injection inlet for molten plastic, such as cellulose plastic material, and one or more of the die parts being cooled, if desired, in any suitable manner. Any suitable means (not shown) may inject the molten plastic at extremely high pressure, and any suitable means (not shown) may open and powerfully close the die. The insertion of the wire core and the removal of the molded article may be accomplished in any feasible manner. The die, as well as the wire core, may consist of iron, steel or other metal or metallic composition as may be preferred, and any feasible plastic may be employed which is capable of use. The temperatures utilized may range from room temperature or lower for the cooled die member to perhaps 300 degrees F. for the incoming plastic. The device produced is thin and bendable to suit, and is best exemplified by a wire core spectacle temple. The foregoing observations, supplemented by the knowledge of the prior art, are intended to apply to all the drawings herein, to avoid otherwise needless repetition.

The die 21 may include a plurality of die members 22, 23, one of which may be water cooled as at 24, and one of them constituting a gate. The die members co-operate to afford a longitudinal die cavity 25, one of them having an inlet channel 26 in generally axial alinement with the die cavity 25 at one end thereof. At the opposite ends of the cavity, one of the die members is provided with outward opening recesses 27 to receive the ends of a wire core 28, the companion die member having ridges 29 to fit the recesses and enter the same as the die is closed, to thus clamp the ends of the wire core in the inner ends of the recesses. If desired the wire core may have an offset at 30 to reenforcingly pass through the hinge piece 31 of the molded sheath 32 which encases the wire core, according to the article 33 shown in Fig. 3, produced by the die. The projecting ends 34 of the wire core may be cut off square to finish the spectacle temple, and it is then merely necessary to drill a central pintle hole just to one side of the wire core to complete the hinge piece for assembling the temple with a spectacle frame.

According to the method, the wire core 28 is placed in the die cavity, the die is closed, clamping the wire core at its ends, with the wire core extending generally centrally of the die cavity. Then the plastic is axially injected, causing a superior rapid filling of the die cavity, without excessive lateral deforming pressure on the wire core. When the die is opened, the article 33 produced is removed and finished as above described.

In Figs. 4 to 6 is shown a modified form of the invention, including a die 35 having a plurality of die members 36, 37 cooperating to provide a die cavity 38 to receive a wire core 39. As in the die 21, the inlet channel 40 leads generally axially to the die cavity, preferably at the enlargement 41 at which the hinge piece is molded. In order to tension the wire core, the latter may have end heads 42 cooperating with the die so that the die members tension the wire core upon closing the die. Thus the die member 36 may have forked portions 43 to engage under the heads 42, the adjacent faces or seats for the heads formed on the forked portions being inclined, so that as the wire core is pushed into the forks, the latter serve to move the heads apart to tightly stretch the wire core almost to its elastic limit. The companion die member, or other means may press on the heads 42 as by means of wall portions 44 to cause the tensioning action as the die is closed. The die members may be suitably interfitted as at 45 to tightly embrace the wire core, and at 46, so as to prevent leakage of plastic material. Since the latter will not flow through minute openings leakage is readily avoided.

The method is generally the same for the devices 21 and 35. The article 47 produced is finished in a manner generaly similar to that described for the article 33.

In Fig. 8 is shown a die 48 embodying the invention and including die members 49, 50 co-operating to provide a die cavity 51. For holding the wire core at its ends, these die members may have recesses and projections 27, 29 interfitting as in Fig. 1, and operating in the same manner. Likewise, the wire core 28 is as before described, except that in this instance, a spacer or tube 52 of plastic material is threaded thereon, and may be frictionally held in place on the wire core. One of the die members 49 is provided with a plurality of inlets 53 above and below the spacer tube 52, and for instance, laterally thereof. Preferably the inlets 53 are closely adjacent to the ends of the tube 52 to assure fusion therewith of the incoming molten plastic material. Since the tube 52 relatively snugly fits the die cavity, it securely holds the wire core against deformation due to lateral strains that may be caused by the inrush of the molten plastic.

The method in connection with the device 48 is generally similar to that for the device 21, and the article produced is like the article 33, and is finished in a similar manner.

In Figs. 9 to 12 is shown a modified apparatus embodying the invention, including a die 54 having die members 55, 56 cooperating to provide a die cavity 57 for a wire core 58. The latter may have a laterally bent part 59 inserted into a recess 60 of a die member, said recess communicating with a chamber which movably houses a steel ball 61. The latter nonremovably slightly projects from its chamber so as to contact a surrounding wall 62 on the other die member, whereby the ball is moved to clamp the part 59 as the die is closed. Similar or other lateral holding means may be provided at the other end or at any other suitable part of the wire core; for example, spacer sleeves 63, 64 may be threaded onto the central and lower end parts of the wire core, these being like the sleeve 52.

If it be desired to produce a tapered temple 65 as shown in Figs. 13 and 14, the upper part of the wire core may be flattened, and the upper and lower end of the temple may be made wider, with the wire core preferably terminating above the lower end of the temple. The metallic hinge piece (not shown) may be riveted to the upper end of the temple through the flattened part of the wire core, after the projecting wire core part 59 has been cut off.

For the accomplishment of these results, the wire core is suspended in the die at the recess 60 with its lower end above the lower end of the die cavity. Further, it will be observed that whereas the spacer sleeve 63 closely fits the die cavity, the spacer sleeve 64 is spaced from two opposite sides of the wider die cavity section in which it is received, so that plastic material is free to flow through the resulting spaces to produce the widened portion of the temple and to seal the tube 64.

Except as above described, the method practised with the device 54 is like that referred to for the device 48.

In Fig. 15 is shown another modification of the invention, including a die 66 having die members 67, 68 providing a die cavity 69. One of the die members is provided with a plurality of electrical contacts or electrodes 70, suitably insulated and projecting into the die cavity to provide combined spacing and contact means for the wire core 71. The latter may have an insulator sleeve 72 like that at 52. Since the wire core is frictionally fitted in the sleeve 72 and the latter frictionally held in the die cavity, the wire core may be positioned in a reliable manner.

The method in respect to the device 66 may be similar to that described for the devices 48 and 54, except that an electrical current may be passed through the wire core to heat the same so as to avoid undue chilling of the incoming plastic. In fact, the temperature of the wire core may be such as to promote liquidity of the plastic, without unduly interfering with the solidification thereof. In this manner, the rapid filling of the mold may be facilitated, despite the frictional resistance offered by the wire core. In lieu of the method of heating shown, the wire core may be heated externally of the die, and then inserted thereinto. The article produced may be like that shown in Figs. 13 and 14, but without the lateral projection 59.

In Figs. 16 and 17 is shown another modification of the invention including a die 73 having die members 74, 75 providing a die cavity 76, and operative to tension the wire core 77 coincident with the closing of the die. The core 77 may be taken from a reel or long length of wire stock and cut as it is fed to the die. One die member 75 may have alined forks or recesses 78 in its end walls for removably laterally receiving the wire core, with the ends thereof projecting outside of the die. To afford end closures for the die, plates 79 may be provided removably laterally secured in recesses 80 in the die member 74 and snugly suitably interfitting between the die members so as to close the fork openings 78. These plates may have snug fitting perforations through which the wire core may be removably threaded in alined relation. At the upper end of one of the die members is mounted a pair of gripper fingers 81, each being disposed for pivotal motion in different planes, as by means of its individual pivot pin 82 having a ball 83 secured in the die member. By providing a suitable degree of clearance about the pin 82, a limited degree of universal motion is afforded. For actuating the fingers 81, which are adapted to clamp therebetween the projecting end of the wire core, the companion die member may have a cam means 84 providing opposed cam faces 84a and an upward facing cam face 85 therebetween so arranged that the cam faces 84a are first operative on closing movement of the die to cause the fingers 81 to clamp the wire core and then the cam face 85 is operative to upwardly tilt the fingers to tension the wire core while the fingers remain clamped on the wire core. If desired, a tension coil spring 86 may interconnect the fingers 81 to tend to close the same. At the lower end of the die, a similar arrangement may be provided except that the fingers 81 are not swingable vertically, the parts 82a and 83a being snugly secured except for angular movement about their axes, with the fingers being actuated by the cams 84a while riding along the plane faces 87 of the companion die member. When the wire core has thus been secured and tensioned, the plastic material may be injected in any suitable manner as by means of the branch, angular ports 88.

The method practised in connection with the device 73 may be as hereinbefore described, for instance, for the device 35, and a temple generally like 33 produced, except that the heads 42 for the wire core are omitted, whereby this operation is saved.

In Figs. 18 and 19 is shown still another modification of the invention, including a die 89 having die members 90, 91 cooperating to provide a die cavity 92, one of the die members having an inlet port 93 alined with the die cavity. According to the present arrangement, means is provided for holding the wire core in eccentric relation to the die cavity to provide a maximum area of direct flow for the molten plastic. The importance of this resides in the fact that the finished temple may not exceed at its narrowest portion 0.1 inch in diameter, whereas the wire core is generally 0.04 inch, so that the wall of the plastic casing would be about 0.03 inch thick. Now, plastic material will not readily enter a space less than 0.015 inch in width, so, according to the present invention, the wire core 94 is spaced from the wall of the die member 91 a distance of about 0.015 inch, leaving a distance of about 0.045 inch between the wire core and the wall of the die member 90. Thus a flow space is obtained having considerably less frictional resistance, and from which the plastic may flow laterally around the wire core. The securement of the wire core may be effected in any manner hereinbefore described. If desired, the die member 91 may hold a soft iron core magnetically. Preferably, I provide a series of spaced projections or transverse ridges 95 in the cavity of the die member 91, with the lower end of the wire core received in a recess 27 into which a ridge 29 enters to clamp the wire core on closing the die, as described for the device 21. If the upper end of the wire core be provided with an integrally formed, and spot welded closed ear 96 to reenforce the hinge piece that may be molded as part of the temple, the wire core must be held against turning in the die. Hence the lower end portion 97 of the wire core may be flattened.

The method practised in connection with the device 89 may be like that described for the device 21, except that a projecting wire core portion is formed only at one end of the article 98 produced. The latter will possess the great advantage of having a powerfully reenforced hinge piece 99. The projections 95 will result in slight recesses 100, which will be relatively obscure, being on the inner face of the temple. If desired, to assure further accuracy of positioning of the wire core, additional offset projections such as 95a may be provided along a plane at right angles to that of the projections 95 and will result in recesses 100a in the temple. Or a metal pin 101 may be frictionally fitted in the ear with the projecting ends of the pin serving as spacers in the die. If desired, the plastic may be injected at the bottom of the die, wholly remote from the wire core ear. Should it be preferred not to use the ear 96, the wire core may be secured top and bottom as in the device 21.

It will be appreciated that various combinations and arrangements have been disclosed herein for realizing the objects of the invention in a broad sense. Thus axial and lateral flow arrangements, tensioning, axial and lateral holding arrangements for the wire core, and central and offset positioning have been disclosed, with straight and bent wire cores, but any and all of these features may be combined in numerous different ways, as will be readily evident to those skilled in the art after considering the principles of the invention. For brevity, only certain selected modifications have been shown to illustrate different principles in die and temple constructions and in methods, but once these principles are recognized, it will be immediately appreciated that other combinations and arrangements may be arranged therefrom, and hence the accompanying claims are to be interpreted in a correspondingly broad sense. Further, it will be understood that cooling of the die may be omitted, or only air cooling used. In respect to the plastic spacer tube, the same may be considered a part of the apparatus until it becomes an integral part of the temple.

I claim:

1. The method of injection molding a spectacle temple having a flexible wire core and a plastic sheath encasing the same, including centrally placing a straight flexible wire core in an elongated mold so that the wire case is spaced throughout from the side walls of the mold cavity, tensioning said wire core and maintaining the same tensioned during the injection of plastic into the mold, and then injecting the plastic under high pressure into the mold in a direction generally longitudinally of the mold, with the tension on the wire core being sufficiently great to prevent deflection of the wire core by the injection force of the plastic.

2. An apparatus for making wire core temples, including a mold comprising a plurality of die sections movable toward and away from each other in opening and closing the mold, said mold being adapted to receive a wire core having end portions projecting beyond the mold cavity, clamping means for the individual projecting portions of the wire core, at least one of said clamping means being mounted on the said mold, a cam on one die section, said cam being engageable with a part of a companion clamping means on the other die section upon moving the die sections toward each other, said part of the clamping means being movably mounted so as to be actuated by said cam to cause tensioning of the wire core.

3. An apparatus for making wire core temples, including a mold comprising a plurality of die sections movable toward and away from each other in opening and closing the mold, said mold being adapted to receive a wire core having end portions projecting beyond the mold cavity, clamping means for the individual projecting portions of the wire core, at least one of said clamping means being mounted on the said mold, said clamping means comprising a pair of pivotally interconnected jaws, means pivotally mounting said jaws on one die section for bodily movement of the jaws in the general direction of their pivotal interconnection and cam means on the other die section, comprising a U-shaped cam portion for causing clamping movement of the jaws toward each other, and a cam portion for causing said bodily movement of the jaws to tension the wire core, said cam means being operative upon movement of the die sections toward each other.

4. An apparatus for making wire core temples, including a die having a plurality of sections movable toward and away from each other, said die being adapted to receive a wire core projecting beyond the die cavity, means mounted on said die and operative by said sections upon movement thereof toward each other, comprising clamp portions serving to grip the adjacent projecting portions of the wire core, at least a part of one of said clamp portions being movable to cause longitudinal tensioning of the wire core, and cam means mounted on a section and operative by movement of said sections toward each other to cause said movement of said part for tensioning the wire core.

JOSEPH BRUNETTI.